United States Patent [19]

Hemmerlein et al.

[11] Patent Number: 5,357,918
[45] Date of Patent: Oct. 25, 1994

[54] VALVE OPERATING MECHANISM FOR INTERNAL-COMBUSTION ENGINES

[75] Inventors: Norbert Hemmerlein, Pforzheim; Thomas Kannen, Wiernsheim, both of Fed. Rep. of Germany

[73] Assignee: Dr. Ing. h.c.F. Porsche AG, Fed. Rep. of Germany

[21] Appl. No.: 116,756

[22] Filed: Sep. 7, 1993

[30] Foreign Application Priority Data

Sep. 10, 1992 [DE] Fed. Rep. of Germany ......... 230227

[51] Int. Cl.$^5$ .................. F01L 3/00; F01L 1/24; F01L 3/02; F01L 3/10
[52] U.S. Cl. .................. 123/90.67; 123/188.13; 251/337
[58] Field of Search ............ 123/90, 48, 90.65, 90.67, 123/90.51, 188.13, 188.3; 251/337

[56] References Cited

U.S. PATENT DOCUMENTS

| | | | |
|---|---|---|---|
| 4,180,030 | 12/1979 | McWhirter | 123/90.67 |
| 4,432,311 | 2/1984 | Holtzberg et al. | 123/90.67 |
| 4,665,869 | 5/1987 | Hinz et al. | 123/90.67 |
| 4,838,218 | 6/1989 | Saito et al. | 123/90.67 |
| 4,852,531 | 8/1989 | Abkowitz et al. | 123/188.3 |
| 4,879,978 | 11/1989 | Pierce | 123/90.67 |
| 5,081,976 | 1/1992 | Dahm et al. | 123/90.51 |
| 5,143,351 | 9/1992 | Pierce | 123/90.67 |
| 5,168,841 | 12/1992 | Suzuki et al. | 123/90.48 |
| 5,169,460 | 12/1992 | Mae | 123/188.3 |

FOREIGN PATENT DOCUMENTS

| | | |
|---|---|---|
| 0438164 | 7/1991 | European Pat. Off. . |
| 1700029 | 6/1970 | Fed. Rep. of Germany . |
| 3201023 | 7/1983 | Fed. Rep. of Germany . |
| 3809954 | 8/1989 | Fed. Rep. of Germany . |
| 3920729 | 1/1991 | Fed. Rep. of Germany . |
| 4138985 | 6/1992 | Fed. Rep. of Germany . |
| 9300820 | 4/1993 | Fed. Rep. of Germany . |
| 2384166 | 3/1978 | France . |
| 8908770 | 9/1989 | PCT Int'l Appl. . |

OTHER PUBLICATIONS

Patent Abstracts of Japan, vol. 15, No. 257 (Mazda Motor Corp.) JP 3,085,306, Oct. 1991.
Patent Abstracts of Japan, vol. 15, No. 374 (NGK Spark Plug Co., Ltd.) JP 3,149,305, Jun. 1991.
Patent Abstracts of Japan, vol. 9, No. 100 (Toyota Jidosha KK) JP 59,224,410, Dec. 1984.
Revolutionärer Diesel–Motor von Ford in der Entwicklung, Krafthand, Aug. 2, 1986, 3 pages.
Zehn Jahre Erfahrung mit Titan im Automobilbau, Von Hans Mezger, VDI-Z 117 (1975) Nr. 7- Apr. (1), pp. 319–327 and one additional page.

*Primary Examiner*—E. Rollins Cross
*Assistant Examiner*—Weilun Lo
*Attorney, Agent, or Firm*—Evenson, McKeown, Edwards & Lenahan

[57] ABSTRACT

A valve operating mechanism for internal-combustion engines has a valve and a pressure spring which is to move the valve into a closed end position and which is supported on a spring plate. For the reduction of the valve operating masses, at least the valve, the pressure spring and the spring plate are optimized with respect to their weight. The spring plate consists of a plastic material and has widenings of the cross-section for absorbing the occurring stresses.

7 Claims, 2 Drawing Sheets

VALVE OPERATING MECHANISM FOR INTERNAL-COMBUSTION ENGINES

BACKGROUND AND SUMMARY OF THE INVENTION

The present invention relates to a valve operating mechanism for internal-combustion engines and has a valve and a pressure spring which seeks to move the valve into an end portion, the operating mechanism being supposed on a spring plate molted on an area of the valve which is adjacent to the valve shaft end.

As shown in German Patent Document DE-41 38 985 A1, the friction between a bucket tappet and a camshaft influences the mechanical efficiency ad therefore also the fuel consumption of an internal-combustion engine. This influence rises with an increasing number of valves per cylinder, which is illustrated in German Patent Document DE-40 39 256 A1. In this document, a spring plate is shown which consists of a ferrous-metal material and has a conical hub pan surrounding the valve shaft as well as a supporting part for the pressure spring which extends transversely with respect to the valve shaft. The hub part as well as the supporting part are dimensioned such that, when a ferrous-metal material is used for this spring plate, the occurring forces will be absorbed.

It is a object of the present invention to optimize a valve operating mechanism of an internal-combustion engine in the direction of its mechanical efficiency. However, in this case, special attention is to be paid to components of the valve operating mechanism, such as spring plates, which, because of their constructive structuring, are particularly suitable for a further development.

This and other objects are achieved by the present invention which provides a valve operating mechanism for internal-combustion engines comprising a valve having a valve shaft end, a spring plate mounted on an area of the valve which is adjacent to the valve shaft end, and a pressure spring supported on the spring plate ad providing a force on the valve towards an end position. At least the valve, the pressure spring and the spring plate are optimized with respect to their weights to thereby reduce valve operating masses.

Some of the principal advantages achieved by the invention are that the moved masses of the valve operating mechanism are reduced with the goal of decreasing the spring forces of the pressure spring and therefore the friction between the camshaft and the bucket tappet. As a result, the mechanical efficiency as well as the fuel consumption are improved. A component which can be optimized in a relatively simple manner with respect to moved masses is the spring plate which rests adjacent to the free end of the valve shaft, particularly, if it is made of a plastic material, preferably of a fiberglass-reinforced type. In order to achieve, in the case of such a selection of material, approximately the same conditions with respect to the stability, as they exist in the case of a conventional steel-spring plate, tensions must be reduced or the bendings of the supporting part must be maintained within defined limits. It is also important to avoid accumulations of material so that the "spring plate made of plastic" end product will be free of bubbles. Finally, the centering function of the spring plate for the pressure spring must also be taken into account.

According to the invention, the first widening of the cross-section on the hub part and the second widening of the cross-section on the supporting part as well as their constructive design are suitable for this purpose. In order to take into account the stress factors of the spring plate during the operation of the internal-combustion engine with respect to the temperature (180° to 200° C.), to engine oil (plus additives), to fuel, to water, to combustion residues and to exhaust gases, it is recommended that the following plastic materials be taken into consideration for the selection of materials: polyphthalamide, polyamide 46 (polytetramethylene adipidic-acid amide), phenolformaldehyde, or the like. Finally, injection molding process, casting processes or pressing processes are suitable for the manufacturing.

Other objects, advantages and novel features of the present invention will become apparent from the following detailed description of the invention when considered in conjunction with the accompanying drawings.

DETAILED DESCRIPTION OF THE DRAWINGS

Figure 1:
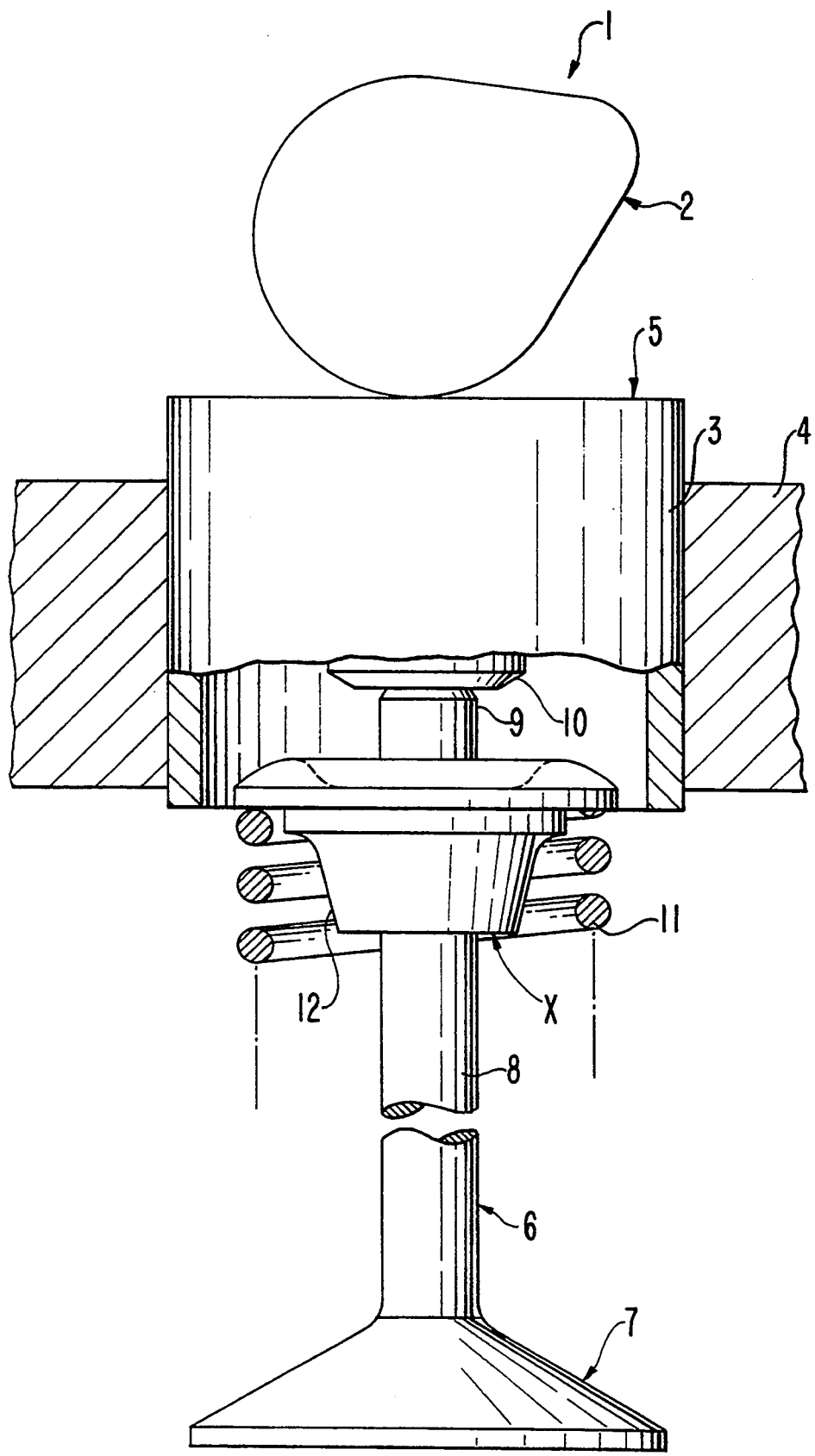
FIG. 1 is a partial cross-sectional view of an internal-combustion engine in the area of a valve operating mechanism constructed in accordance with an embodiment of the present invention.

A valve operating mechanism 1 of an internal-combustion engine, which is not shown in detail and which operates according to the four-stroke method, comprises a camshaft 2, a bucket tappet 5 arranged in a bore 3 of a cylinder head 4 and a valve 6. The valve 6 has a valve disk 7 and a valve shaft 8, whose valve shaft end 9 is supported on a valve clearance compensation piston 10 of the bucket tappet 5. A pressure spring 11 which surrounds the valve shaft 8 seeks to move the valve 6 into a closed end position, the position shown in FIG. 1.

On the one side, the pressure spring 11 is supported on the cylinder head 4 (not shown) and, on the other side, on a spring plate 12 which is held on the valve shaft 8 adjacent to the valve shaft end 9, by suitable devices.

In order to reduce the masses of the valve operating mechanism 1, its components are optimized with respect to weight. In the illustrated embodiment, the bucket tappet 5 is made of an aluminum alloy with steel reinforcements, of ceramics, or the like; the valve is made of titanium, ceramics or the like; and the spring plate 12 is made of a fiber-glass-reinforced plastic material, such as polyphthalamide, polyamide 46 (polytetramethylene adipidic-acid amide)or phenolformaldehyde. Because of this selection of materials, the pressure spring 11 is designed in such a manner that it has a comparatively light weight.

Figure 2:
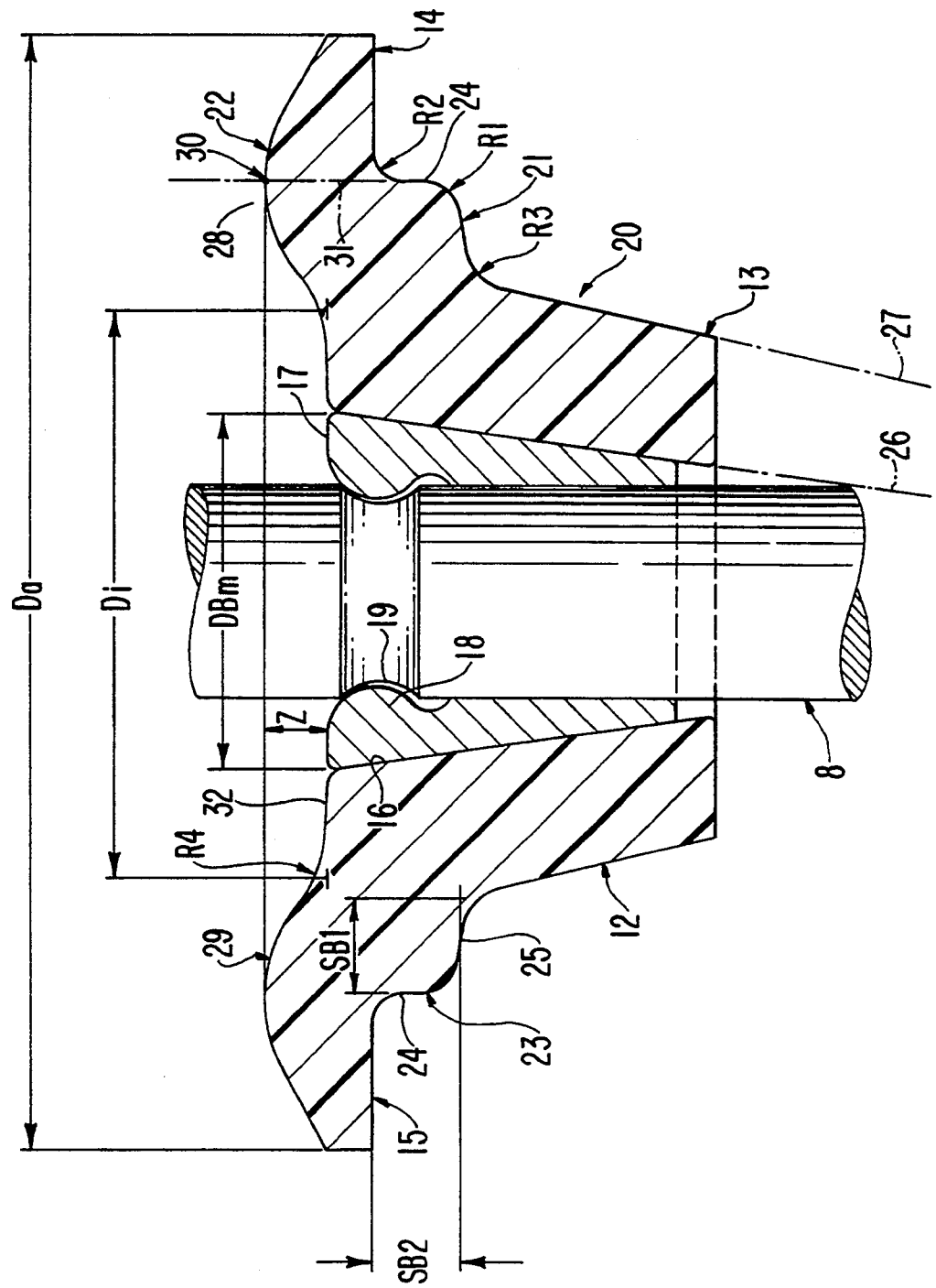
FIG. 2 is a sectional and enlarged detail X of FIG. 1.

According to FIG. 2, the spring plate 12 has a hub part 13 which surrounds the valve shaft 8 as well as a supporting part 14 for the pressure spring 11 which extends transversely with respect to the valve shaft 8. The pressure spring 11 interacts in a supporting manner with a supporting surface 15. A conical hub bore 16 which is constructed for receiving a corresponding ring-type valve cotter 17 is worked into the hub part 13. The valve cotter 17, which is divided into two parts in the axial direction, rests by means of a local thickening 18 in a groove 19 of the valve shaft 8. On the side facing away from the hub bore 16, a first radial widening 21 of the cross-section is provided between the supporting part 14 and the hub part 13. Furthermore, the supporting part 14 has a second axial widening 22 of the cross-section on the side facing away from the pressure spring 11. Both widenings of the cross-section may be arranged in a surrounding or only local manner.

The first widening 21 of the cross-section is constructed in the manner of a step 23 leading away from the supporting part 14, which comprises step areas 24, 25. In this case, the transition between step area 24 and 25 is rounded, specifically by means of a radius R1; likewise, the transitions between the step area 24 and the supporting surface 15 as well as between the step area 25 and the exterior-side hub part 13 are rounded, which is illustrated by the radii R2 as well as R3. The radii R1 to R3 differ in the following aspects: R1<R2 and R2<R3. The step areas 24, 25 have approximately the same lengths: SB1=SB2, in which case they are arranged approximately at a right angle with respect to one another. Step area 24 is used as the radial guide of the pressure spring 11.

In the illustrated embodiment, the hub part 13 has a conical construction, which is demonstrated by the construction lines 26, 27. In this case the hub part B tapers in the direction of the valve plate 7.

The second widening 22 of the cross-section is an elevation 28 which is bounded by a curved line 29. The elevation 28 extends between the outside diameter Da of the spring plate 12 and an inside diameter Di. In this case, the inside diameter Di is larger than the largest diameter DBm of the hub bore 16. The highest point 30 of the elevation 28 intersects a construction line 31 which extends in parallel to the valve shaft 8 and approximately at the same distance between diameter Da and Di and encloses the step area 25 which is directed in the same direction. The transition of line 29 into an axial boundary 32 of the spring plate 12 which is set back with respect to the highest point 30 or is farther away from the valve shaft end 9, is rounded, and is illustrated by the radius R4. Finally, the distance between point 30 and boundary 32 is defined by measurement Z.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. A valve operating mechanism for internal-combustion engines comprising:
    a valve having a valve shaft end;
    a spring plate mounted on an area of the valve which is adjacent to the valve shaft end;
    a pressure spring supported on the spring plate and providing a force on the valve towards an end position;
    wherein at least the valve, the pressure spring and the spring plate are optimized with respect to their weights to thereby reduce valve operating masses;
    wherein the spring plate has a conical hub part which surrounds the valve shaft and is provided with a hub bore, and a supporting part for the pressure spring which extends transversely with respect to the valve shaft, and wherein the spring plate is made of a fiberglass-reinforced plastic and has a first radial widening of a cross-section on a side facing away from the hub bore, between the hub part and the supporting part, and has a second axial widening of the cross-section on the supporting part on an end facing away from the pressure spring; and
    wherein the second axial widening of the cross-section is formed by an elevation rising above a plane which includes radially inner and outer most points on the end face of the spring plate.

2. A valve operating mechanism according to claim 1, wherein the first radial widening of the cross-section is a step extending away from the supporting part, said step including two step areas having a curved surface transitioning therebetween.

3. A valve operating mechanism according to claim 2, wherein said two step areas extend approximately at a right angle with respect to one another and have the same lengths.

4. A valve operating mechanism according to claim 1, wherein the elevation is bounded by a curved line.

5. A valve operating mechanism according to claim 4, wherein the elevation extends between the outer diameter and an inside diameter, the inside diameter being larger than the diameter of the hub bore.

6. A valve operating mechanism according to claim 3, wherein a construction line that extends in the direction of the valve shaft and includes one of the step areas of the step, intersects with the highest point of an elevation forming the second widening.

7. A valve operating mechanism according to claim 1, wherein at least one polyphthalamide, polyamide (polytetramethylene adipidic-acid amide), phenolformaldehyde is the plastic material.

* * * * *